United States Patent
Sun et al.

(10) Patent No.: US 11,677,535 B2
(45) Date of Patent: Jun. 13, 2023

(54) CONCURRENT COMMUNICATION IN MULTIPLE TDD BANDS

(71) Applicant: Google LLC, Mountain View, CA (US)

(72) Inventors: Ming Sun, Mountain View, CA (US); Fei He, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 57 days.

(21) Appl. No.: 17/233,075

(22) Filed: Apr. 16, 2021

(65) Prior Publication Data

US 2021/0297227 A1    Sep. 23, 2021

Related U.S. Application Data

(60) Provisional application No. 63/167,821, filed on Mar. 30, 2021.

(51) Int. Cl.
*H04L 5/26* (2006.01)
*H04L 5/14* (2006.01)
*H04B 1/44* (2006.01)

(52) U.S. Cl.
CPC ............ *H04L 5/26* (2013.01); *H04B 1/44* (2013.01); *H04L 5/14* (2013.01)

(58) Field of Classification Search
CPC ....... H04W 4/80; H04W 76/10; H04W 84/20; H04L 7/027; H04L 7/0008; H04B 5/0006; H04B 5/0031
USPC ....................................................... 370/338
See application file for complete search history.

(56) References Cited

U.S. PATENT DOCUMENTS

| | | | |
|---|---|---|---|
| 8,737,376 B2 | 5/2014 | Park et al. | |
| 9,137,804 B2 | 9/2015 | Lin et al. | |
| 9,596,677 B2 | 3/2017 | Park et al. | |
| 10,389,512 B2 | 8/2019 | Takeda et al. | |
| 2021/0099205 A1* | 4/2021 | Seyed ................ | H04B 7/0413 |
| 2021/0194515 A1* | 6/2021 | Go ...................... | H04B 1/401 |

* cited by examiner

*Primary Examiner* — Kibrom T Hailu
*Assistant Examiner* — Nizam U Ahmed
(74) *Attorney, Agent, or Firm* — Colby Nipper PLLC

(57) ABSTRACT

This document describes systems and techniques directed at concurrent communication in multiple time-division duplex (TDD) bands. As new industry standards (e.g., the Fifth Generation New Radio (5G NR) standard) are being implemented, more TDD bands are becoming available for wireless communications. Generally, manufacturers will add additional antenna systems for each TDD band, but this method may become costly and need extra space, which is already limited, within the user device In various aspects, the concurrent communication system includes a radio frequency (RF) modem module configured to operate on multiple TDD bands, which may include bands that are located near each other on the RF spectrum. The concurrent communication system further includes transceiver circuitry with at least one transmission chain and at least four reception chains. The architecture of this system offers an efficient and inexpensive way to communicate on at least two TDD bands concurrently with reduced hardware cost.

8 Claims, 12 Drawing Sheets

| | Slot 1 702 | Slot 2 704 | Slot 3 706 | Slot 4 708 | Slot 5 710 | Slot 6 712 | Slot 7 714 |
|---|---|---|---|---|---|---|---|
| First Frequency Band | Tx – Ant1 | Rx – Ant1 Rx – Ant2 Rx – Ant3 Rx – Ant4 | Rx – Ant2 Rx – Ant3 Rx – Ant4 | Rx – Ant3 Rx – Ant4 | Flexible w/ Guard Period | Tx – Ant1 | Rx – Ant1 Rx – Ant2 Rx – Ant3 Rx – Ant4 |
| Second Frequency Band | Rx – Ant2 Rx – Ant3 Rx – Ant4 | Flexible w/ Guard Period | Tx – Ant1 | Rx – Ant1 Rx – Ant2 | Rx – Ant1 Rx – Ant2 Rx – Ant3 Rx – Ant4 | Rx – Ant2 Rx – Ant3 Rx – Ant4 | Flexible w/ Guard Period |

| | Slot 8 716 | Slot 9 718 | Slot 10 720 | Slot 11 722 | Slot 12 724 | Slot 13 726 | Slot 14 728 |
|---|---|---|---|---|---|---|---|
| First Frequency Band | Rx – Ant2 Rx – Ant3 Rx – Ant4 | Rx – Ant3 Rx – Ant4 | Flexible w/ Guard Period | Tx – Ant1 | Rx – Ant1 Rx – Ant2 Rx – Ant3 Rx – Ant4 | Rx – Ant2 Rx – Ant3 Rx – Ant4 | Rx – Ant3 Rx – Ant4 |
| Second Frequency Band | Tx – Ant1 | Rx – Ant1 Rx – Ant2 Rx – Ant3 Rx – Ant4 | Rx – Ant1 Rx – Ant2 Rx – Ant3 Rx – Ant4 | Rx – Ant2 Rx – Ant3 Rx – Ant4 | Flexible w/ Guard Period | Tx – Ant1 | Rx – Ant1 Rx – Ant2 |

*FIG. 7*

CONCURRENT COMMUNICATION IN MULTIPLE TDD BANDS

CROSS-REFERENCE TO RELATED APPLICATION

This application claims priority to U.S. Provisional Application Ser. No. 63/167,821, filed Mar. 30, 2021, the entire disclosure of which is hereby incorporated by reference.

SUMMARY

This document describes systems and techniques directed at concurrent communication in multiple time-division duplex (TDD) bands. As new industry standards (e.g., the Fifth Generation New Radio (5G NR) standard) are being implemented, more TDD bands are becoming available for wireless communications. Generally, manufacturers will add additional antenna systems for each TDD band, but this method may become costly and need extra space, which is already limited, within the user device. In various aspects, a concurrent communication system includes a radio frequency (RF) modem module configured to operate on multiple TDD bands, which may include bands that are located near each other on the RF spectrum. The concurrent communication system further includes transceiver circuitry with at least one transmission chain and at least four reception chains. In various aspects, these chains may represent the communication paths of the transmit signals and/or receive signals within the device. The architecture of this system offers an efficient and inexpensive way to communicate on at least two TDD bands concurrently with reduced hardware cost.

In one aspect, a system includes four antennas that support communication in a first frequency band and a second frequency band, an RF modem module, and transceiver circuitry coupling the at least four antennas to the RF module. The RF modem module has a first transceiver port to transmit uplink communications and receive downlink communications in the first frequency band and the second frequency. The RF modem module further includes at least three receive ports to receive respective communications in the first frequency band and the second frequency band.

The transceiver circuitry includes a first transmit chain and at least four receive chains, collectively referred to as communication chains. The first transmit chain includes a first switch with an input terminal coupled to the transceiver port. The first transmit chain further includes a first output terminal coupled to a first antenna through a first bandpass filter for the first frequency band and a second output terminal coupled to the first antenna through a second bandpass filter for the second frequency band.

A first receive chain of the transceiver circuitry includes a second switch with an input terminal coupled to the transceiver port. The first receive chain further includes a first output terminal coupled to the first antenna through the first bandpass and a second output terminal coupled to the first antenna through the second bandpass filter. A second receive chain includes a third switch with an input terminal coupled to a second receive port. The second receive chain further includes a first output terminal coupled to a second antenna through a third bandpass filter for the first frequency band and a second output terminal coupled to the second antenna through a fourth bandpass filter for the second frequency band. Likewise, a third receive chain and a fourth receive chain are configured similarly to the second receive chain.

This Summary is provided to introduce simplified concepts of systems and techniques directed at concurrent communication in multiple TDD bands, the concepts of which are further described below in the Detailed Description and are illustrated in the Drawings. This Summary is not intended to identify essential features of the claimed subject matter, nor is it intended for use in determining the scope of the claimed subject matter.

BRIEF DESCRIPTION OF THE DRAWINGS

The details of one or more aspects of concurrent communication in multiple TDD bands are described in this document with reference to the following drawings:

FIG. 3-1 illustrates an example transmit chain of a system configured for concurrent communication in multiple TDD bands;

FIG. 3-2 illustrates an example receive chain of a system configured for concurrent communication in multiple TDD bands;

FIG. 3-3 illustrates an example transceiver chain including the transmit chain and the receive chain with a common antenna of a system configured for concurrent communication in multiple TDD bands;

FIG. 4-1 illustrates another example receive chain of the system configured for concurrent communication in multiple TDD bands;

FIGS. 4-2 to 4-4 illustrate example implementations of the receive chain of the system configured for concurrent communication in multiple TDD bands;

FIG. 7 illustrates an example subframe of time resources of a wireless network used for concurrent communication in multiple TDD bands.

The same numbers may be used throughout the drawings to reference like features and components.

DETAILED DESCRIPTION

Overview

Figure 1:
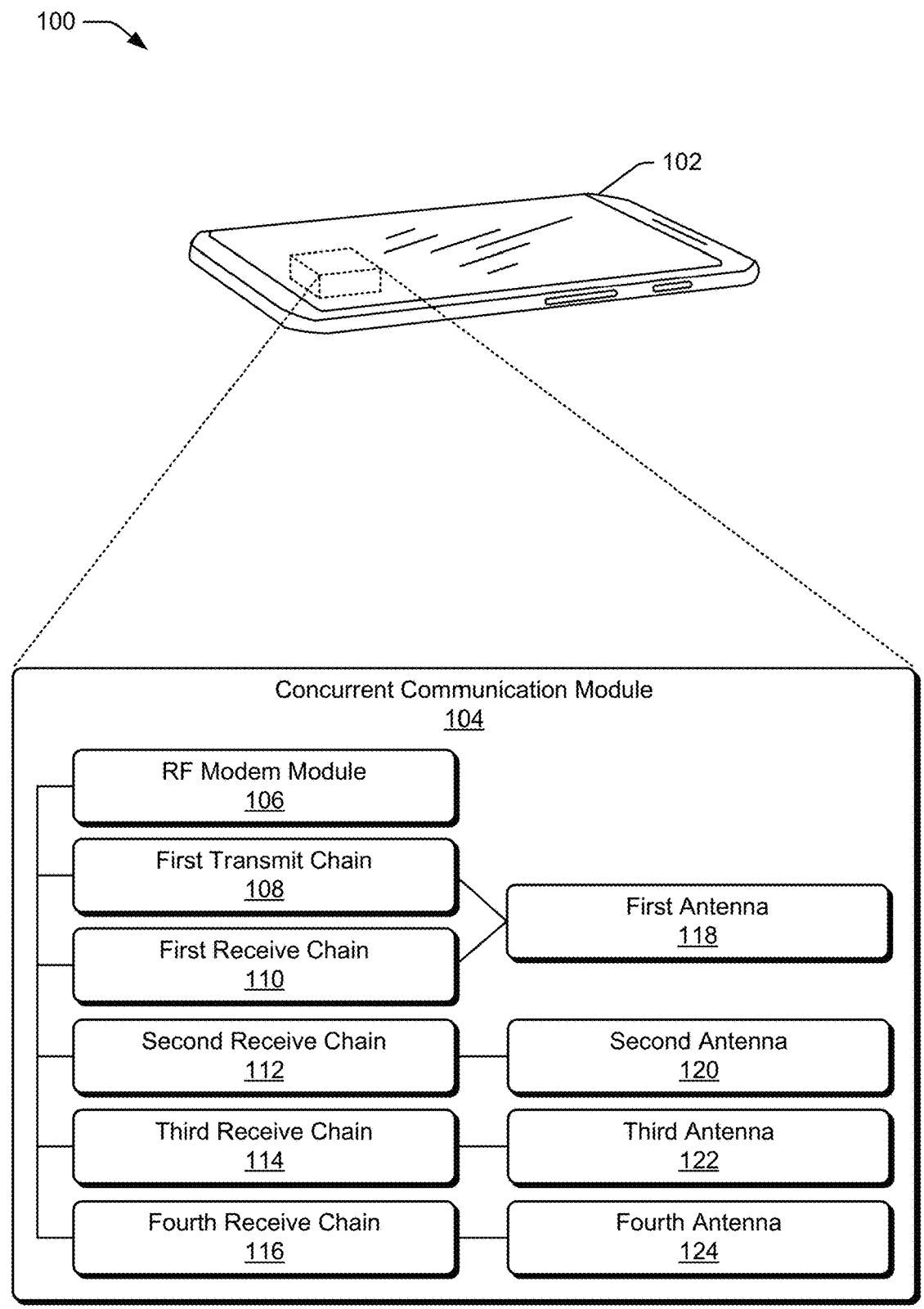
FIG. 1 illustrates an example environment in which a system is configured for concurrent communication in multiple TDD bands.

Wireless spectrum costs have risen rapidly since the introduction of the Fourth Generation Long-Term Evolution (4G LTE) standard several years ago. The costs will continue to rise more dramatically as the Fifth Generation New Radio (5G NR) standard and future standards are implemented. Due to the 5G NR implementation, more RF spectrums will be added into the territorial cellular network.

Most of the RF spectrums being added are TDD-based bands, and many of these bands are located very close to one another. Some examples of spectrum blocks that TDD bands are or will be deployed on include NR band 41 (2496 Megahertz (MHz) to 2690 MHz), NR band 53 (2483.5 MHz to 2495 MHz), NR band 40 (2300 MHz to 2400 MHz), NR band 77 (3300 MHz to 4200 MHz), and NR band 79 (4400 MHz to 5000 MHz).

As more TDD bands are being made accessible for wireless communications, user devices may require more antennas and radio chains to communicate on these bands. Due to many of the TDD bands being close to one another, the diplexers used to split the TDD bands into different radio chains would be prohibitively large for user devices. Likewise, combining the TDD bands into an aggregated wide spectrum block is prohibited due to regulatory restrictions, such as out-of-band emissions in the frequency gaps. Manufacturers are challenged to pursue efficient and inexpensive solutions to these issues.

This document describes systems and techniques directed at concurrent communication in multiple TDD bands. The concurrent communication systems may include an RF modem module configured to operate on multiple TDD bands that located near each other on the RF spectrum. The concurrent communication systems may further include at least one transmission chain and at least four reception chains. The architecture of the disclosed concurrent communication systems may offer an efficient and inexpensive way to communicate on at least two TDD bands concurrently without adding more hardware.

Example System

FIG. 1 illustrates an example environment 100 in which a system is configured for concurrent communication in multiple TDD bands. The user device 102 in this example environment 100 is illustrated as a smartphone. However, the example environment 100 may be other types of user devices such as wearable devices or tablets. The user device 102 may include a concurrent communication module 104 that is configured to operate on at least two frequency bands. The concurrent communication module 104 may include an RF modem module 106, a transmit chain 108 and a receive chain 110. Furthermore, the concurrent communication module 104 may contain a receive chain 112, a receive chain 114, and a receive chain 116. The transmit chain 108 and the receive chains (110, 112, 114, 116) may couple the RF modem module 106 to antennas that are capable of operating on the at least two frequency bands.

The RF modem module 106 may include at least one transmit port (not shown) configured to transmit uplink communications in at least two frequency bands. The RF modem module may further include at least four receive ports (not shown) configured to receive downlink communications in the same at least two frequency bands as the uplink communications.

In the example illustrated in FIG. 1, concurrent communication module 104, the transmit chain 108 and the receive chain 110 may couple the RF modem module 106 to an antenna 118. The receive chain 112 may couple the RF modem module 106 to an antenna 120. Likewise, the receive chain 114 may couple the RF modem module 106 to an antenna 122, and the receive chain 116 may couple the RF modem module 106 to an antenna 124. The RF modem module 106, the transmit chain 108, the receive chains (110, 112, 114, 116), and the antennas (118, 120, 122, 124) may all be capable of operating in the at least two frequency bands on which the concurrent communication module 104 is configured to operate.

Figure 2:
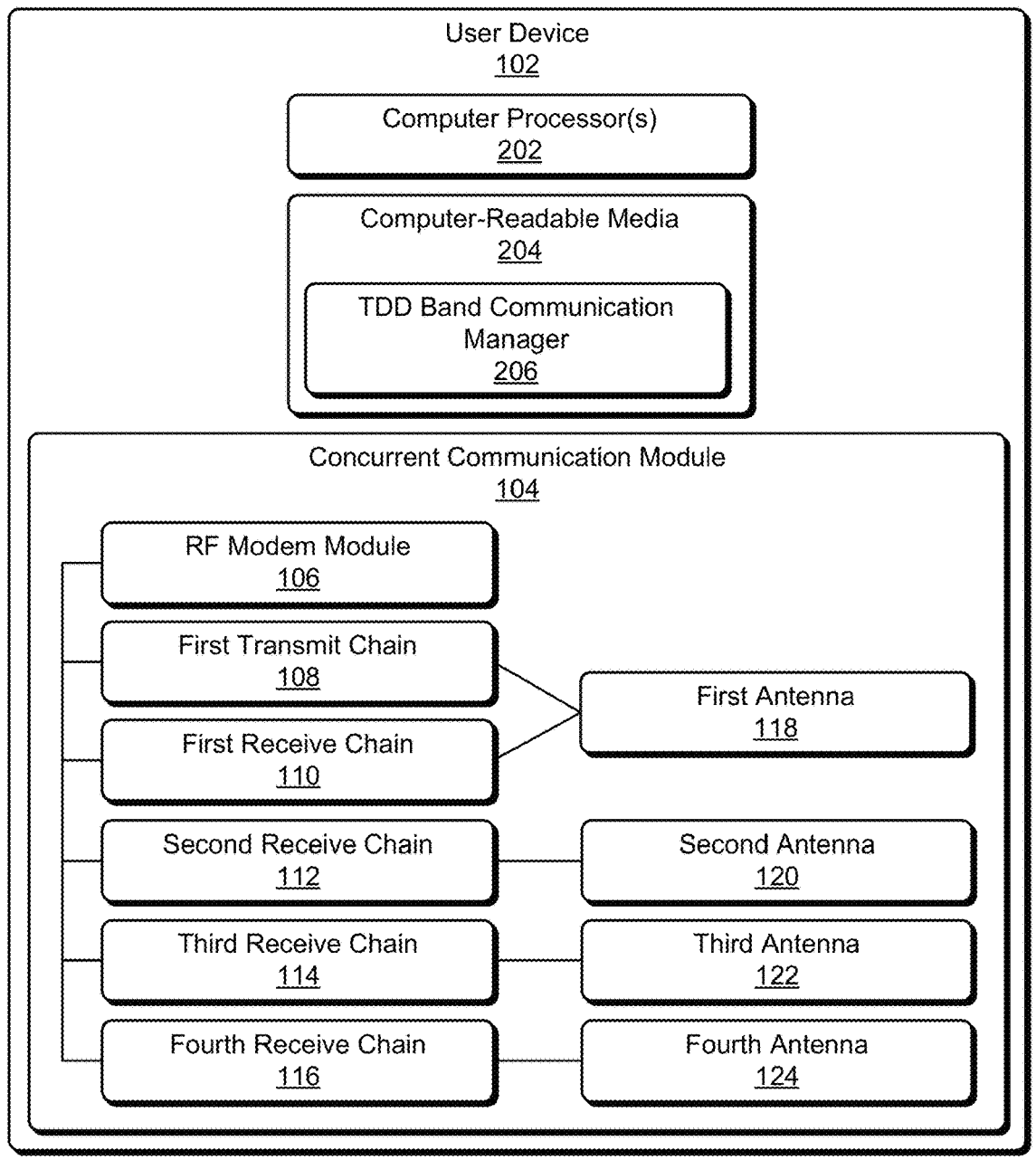
FIG. 2 illustrates an example device diagram for concurrent communication in multiple TDD bands.

FIG. 2 illustrates an example device diagram 200 for concurrent communication in multiple TDD bands. In the example device diagram 200, a user device such as the user device 102 illustrated in FIG. 1, may include one or more computer processors 202, and a computer-readable media 204. The computer-readable media 204 may include any suitable memory or storage device such as random-access memory (RAM), static RAM (SRAM), dynamic RAM (DRAM), non-volatile RAM (NVRAM), read-only memory (ROM), or flash memory.

The computer-readable media 204 may include a TDD band communication manager 206 (communication manager 206). In some aspects of concurrent communication in multiple TDD bands, the communication manager 206 may be configured to control the concurrent communication module 104 to transmit and receive the at least two frequency bands on which the concurrent communication module 104 is configured to operate. The details of the operations of the communication manager 206 will be further discussed herein.

Example Architecture

Figures 1, 3:
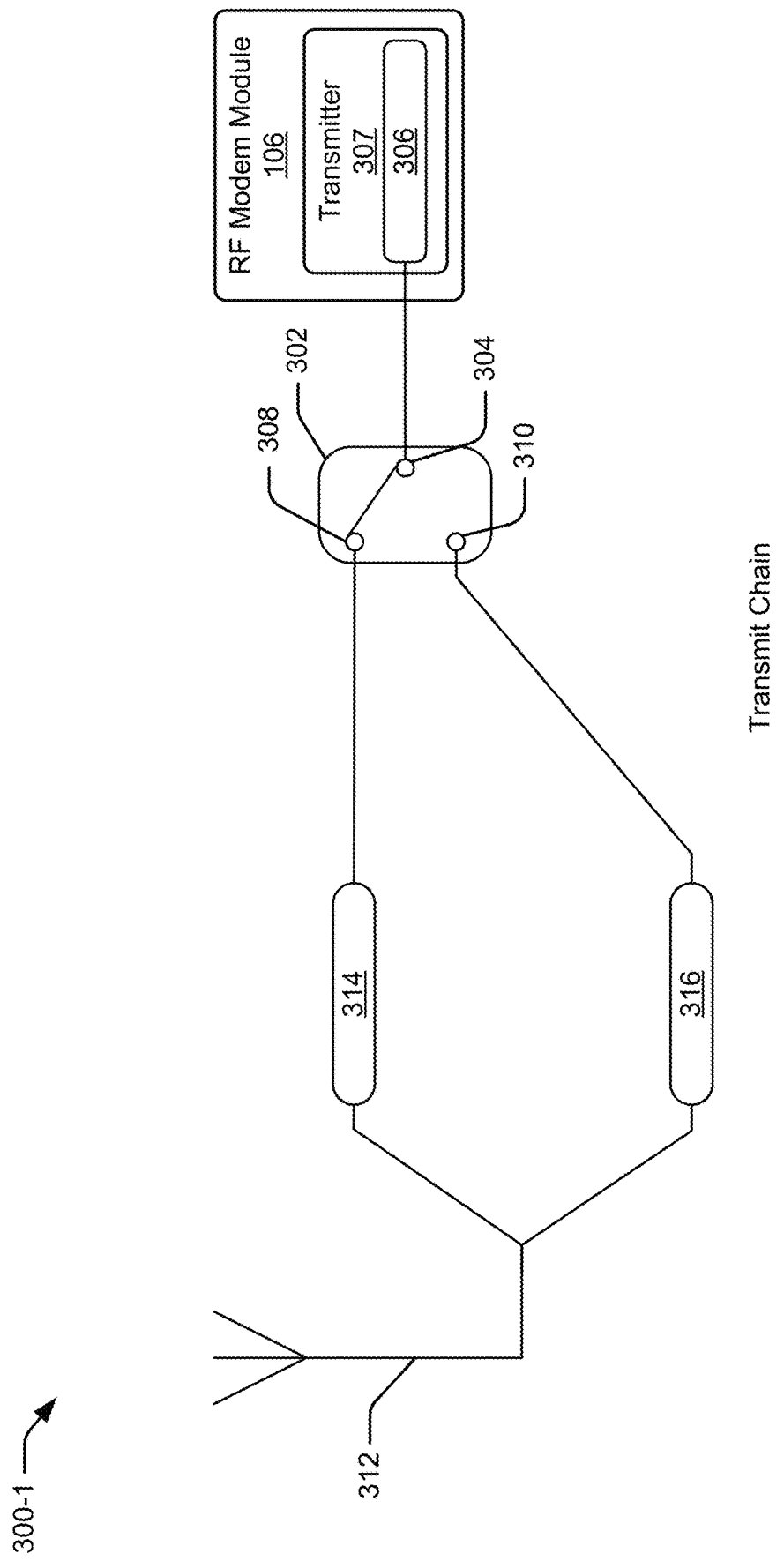
Figures 2, 3:
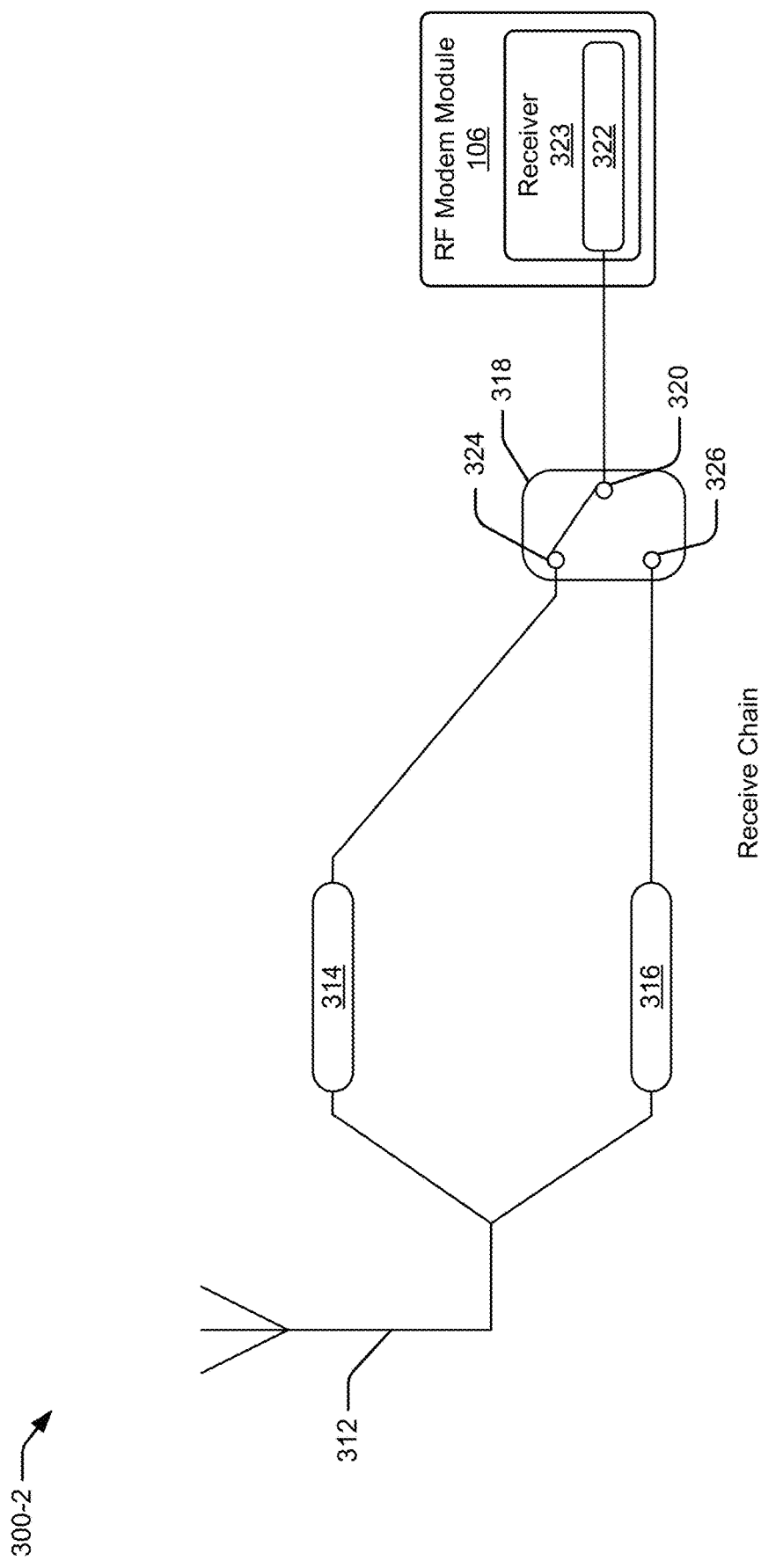
Figure 3:
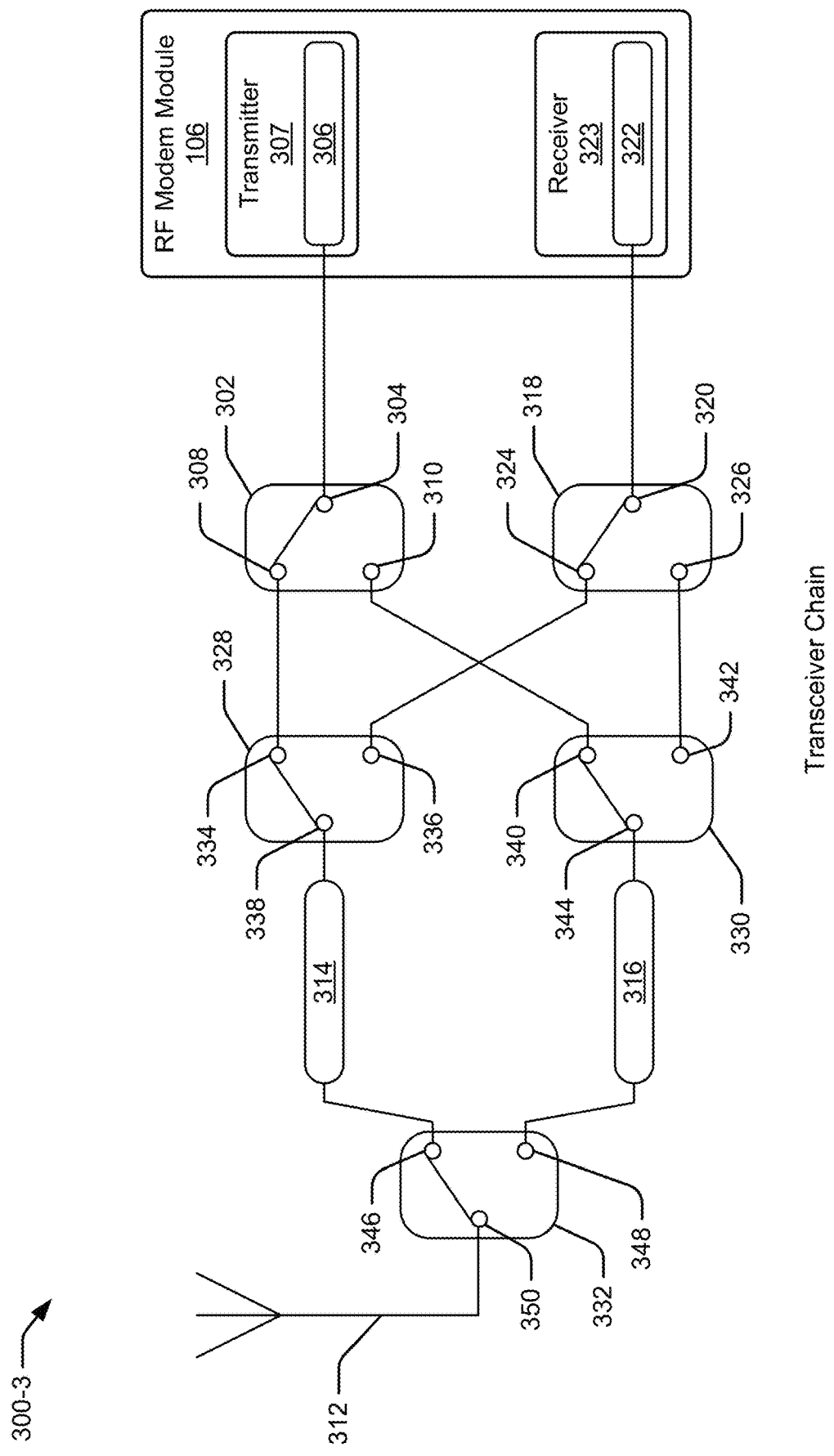

FIG. 3-1 illustrates an example first transmit chain 300-1 (e.g., the transmit chain 108 from FIG. 1) of a system configured for concurrent communication in multiple TDD bands. The transmit chain 300-1 may include a switch 302 with an input terminal 304 coupled to a transmit port 306 of a transmitter 307 of an RF modem module (e.g., the RF modem module 106). The switch 302 may further include an output port 308 and an output port 310. The output port 308 may be coupled to an antenna 312 (e.g., the first antenna 118 from FIG. 1) through a bandpass filter 314. The output port 310 may be coupled to the antenna 312 through a bandpass filter 316.

FIG. 3-2 illustrates an example receive chain 300-2 (e.g., the first receive chain 110 from FIG. 1) of a system configured for concurrent communication in multiple TDD bands. The receive chain 300-2 may include a switch 318 with an input port 320. The input port 320 may be coupled to a receive port 322 of a receiver 323 of the RF modem module. The switch 318 may have an output port 324 and an output port 326. The output port 324 may be coupled to the bandpass filter 314 which may be coupled to the antenna 312. The output port 326 may be coupled to the antenna 312 through a bandpass filter 316.

FIG. 3-3 illustrates an example transceiver chain 300-3 including the transmit chain 300-1 and the receive chain 300-2 with a common antenna and shared transmitter 307 and receiver 323 of a system configured for concurrent communication in multiple TDD bands. The transceiver chain 300-3 may combine the transmit chain 300-1 and the receive chain 300-2 such that they share the antenna 312, and the bandpass filters 314 and 316. Likewise, the two chains 300-1 and 300-2 may share a switch 328, a switch 330, and a switch 332. The switch 328 may have an input port 334 coupled to the output port 308 of the switch 302 and an input port 336 coupled to the output port 324 of the switch 318. The switch 328 may further include an output port 338 that is coupled to the bandpass filter 314.

The switch 330 may have two input ports 340 and 342 and an output port 344. The input port 340 may be coupled to the output port 310 of the switch 302. The input port 342 may be coupled to the output port 326 of the switch 318. The output port 344 may be coupled to the bandpass filter 316.

The switch 332 may couple the antenna 312 to the two bandpass filters 314 and 316. An input port 346 of the switch 332 may be coupled to the bandpass filter 314 and an input port 348 of the switch 332 may be coupled to the bandpass filter 316. An output port 350 may couple the switch 332 and the antenna 312.

Figures 1, 4:
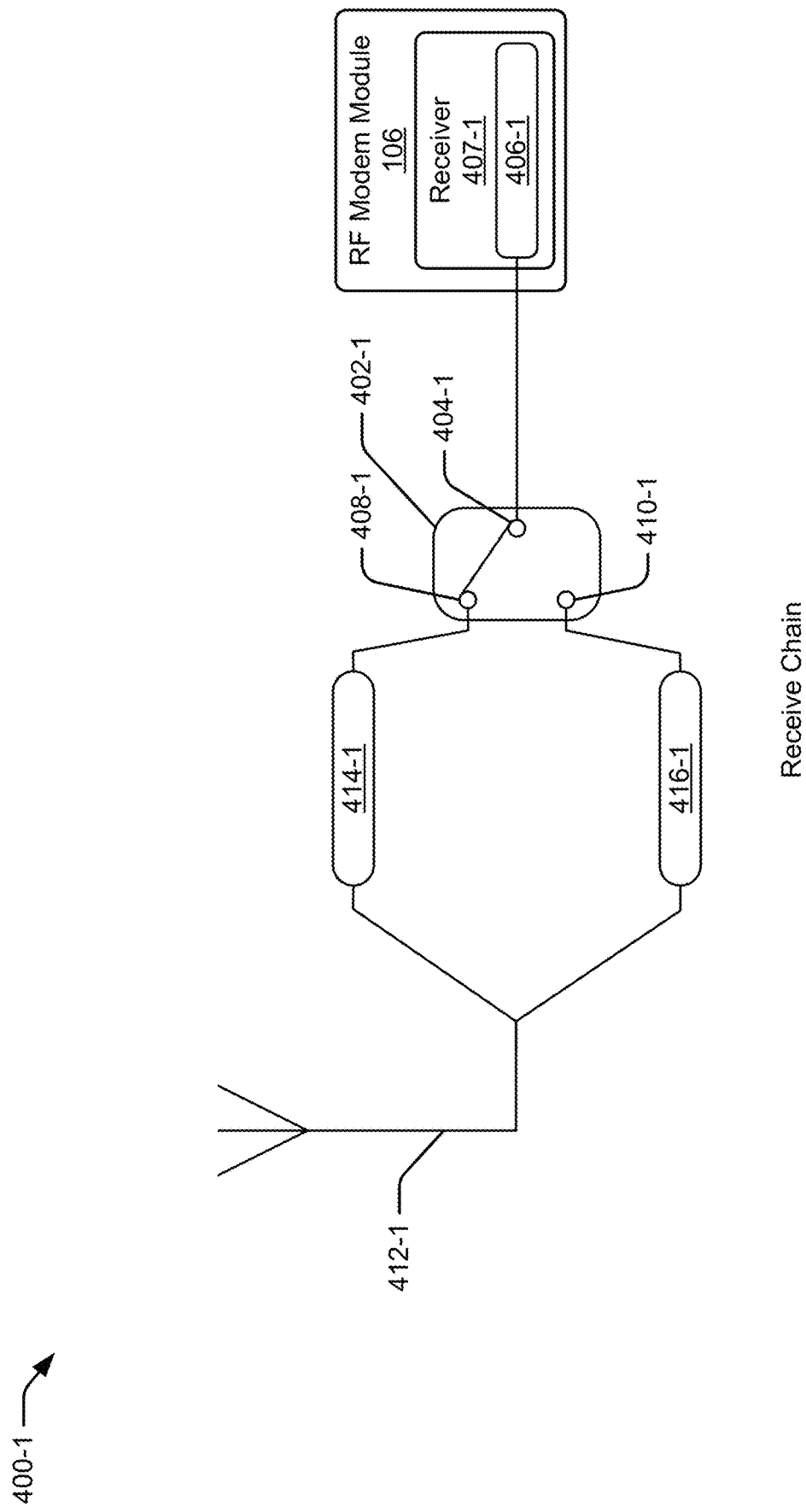
Figures 2, 4:
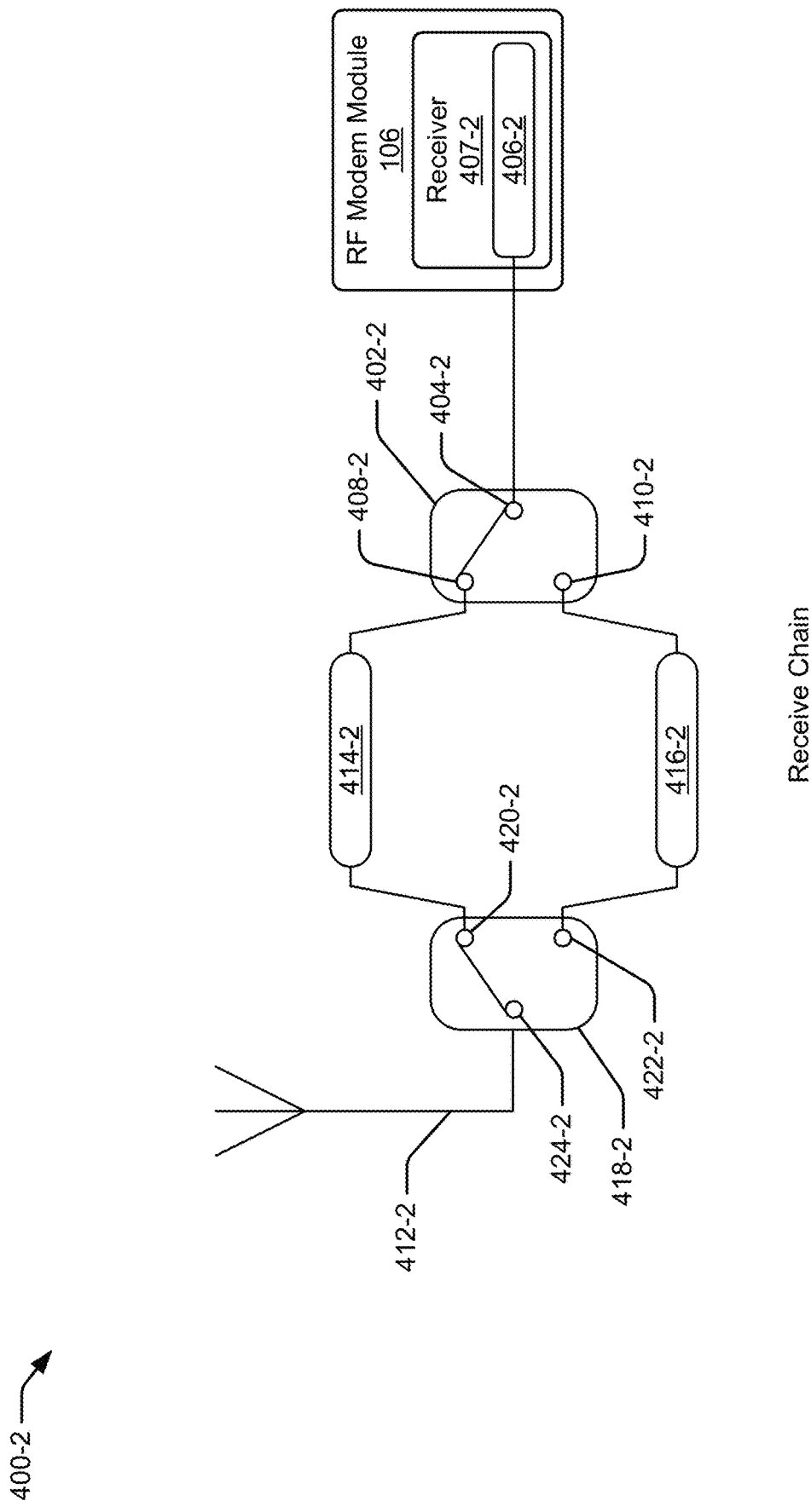
Figures 3, 4:
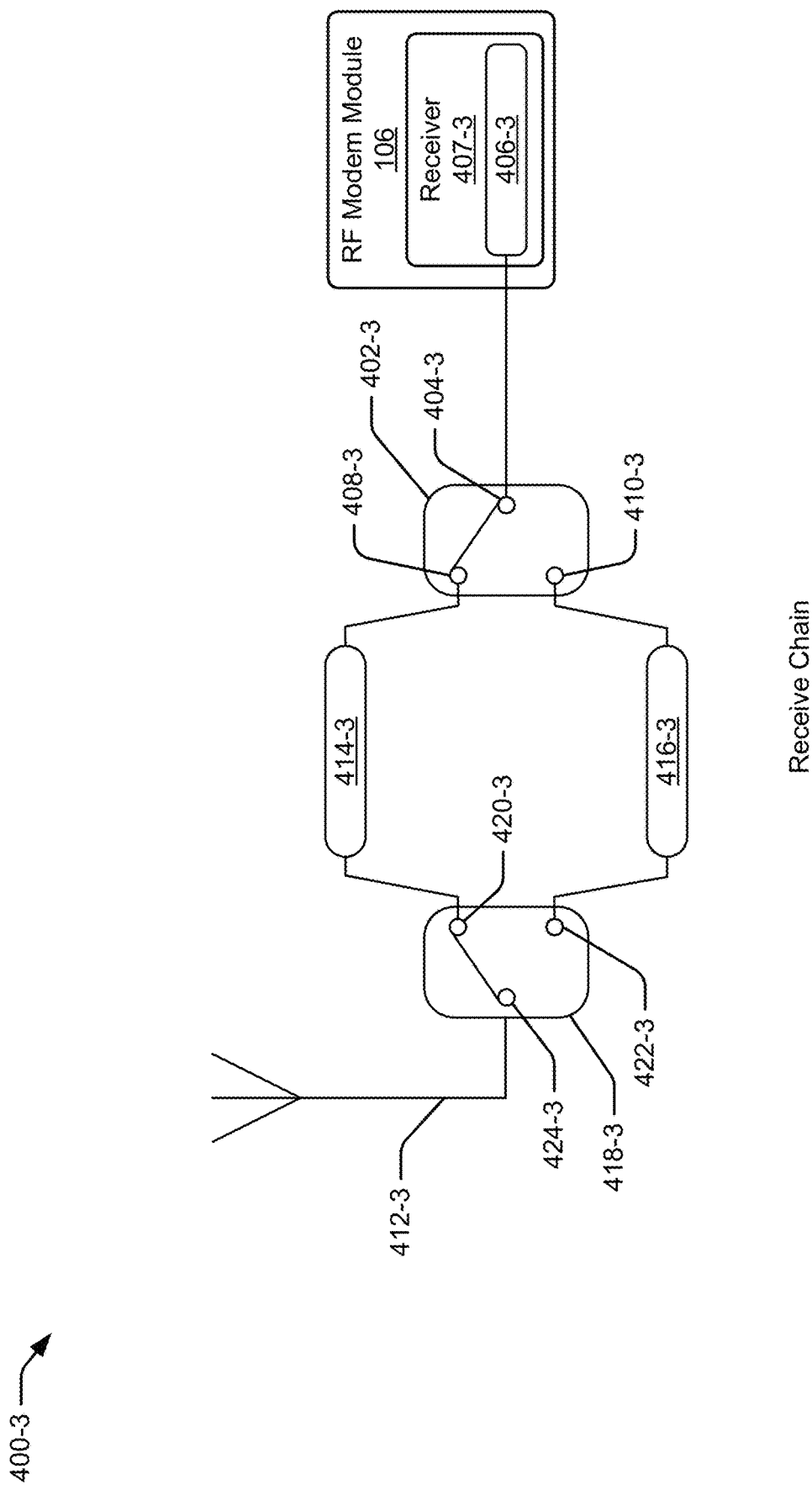
Figure 4:
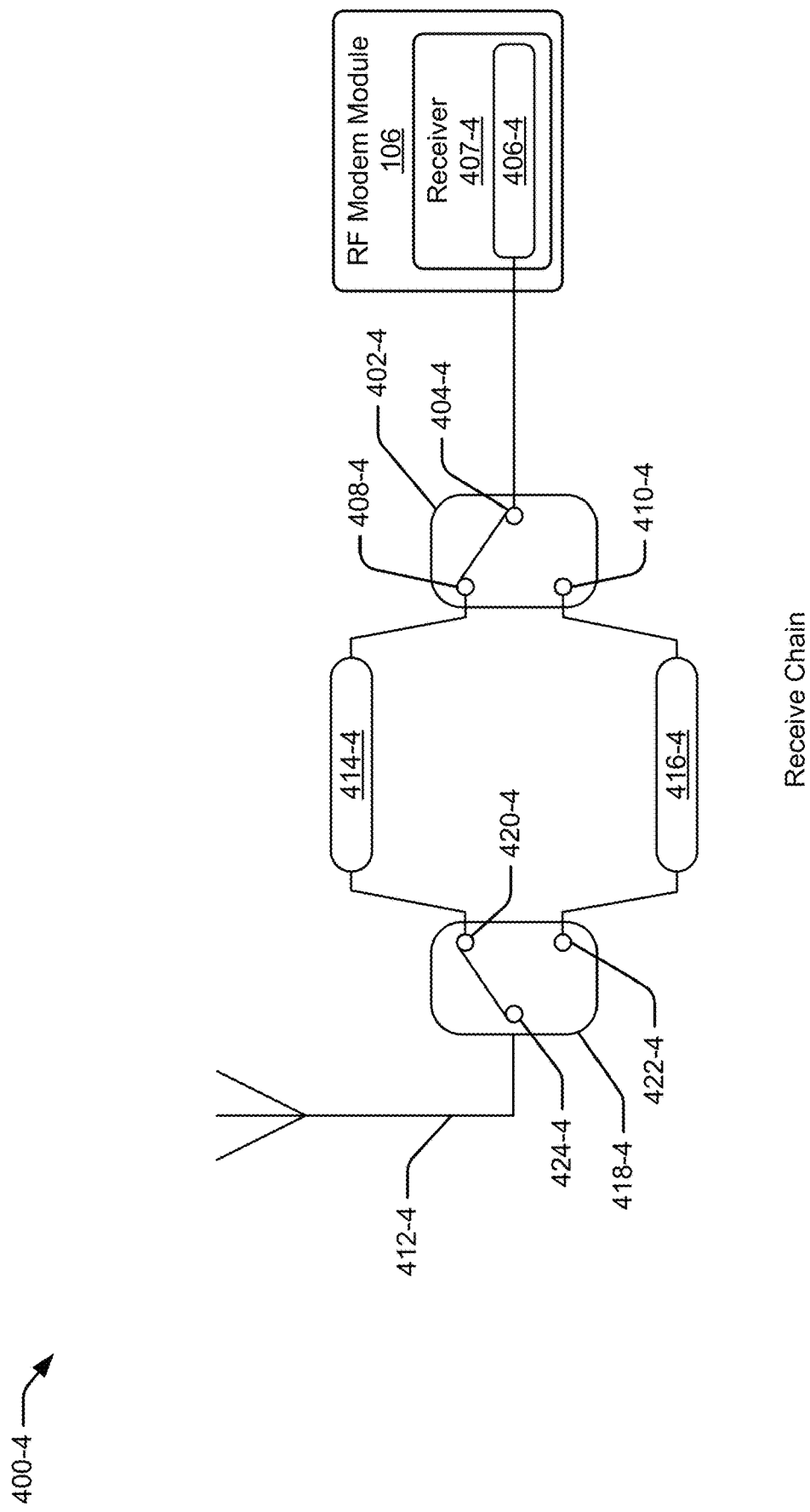

FIG. 4-1 illustrates another example receive chain 400-1 of the system configured for concurrent communication in multiple TDD bands. The receive chain 400-1 may serve as a model receive chain that will not be combined with a transmit chain. For example, the receive chain 400-1 may be a model of the second to fourth received chains (112, 114, 116) as illustrated in FIG. 1. In the example, a switch 402-1 may include an input port 404-1 that is coupled to a receive port 406-1 of a receiver 407-1 included in an RF modem module, such as the RF modem module 106 from FIG. 1. The switch may further include an output port 408-1 and an output port 410-1. The output port 408-1 may be coupled to an antenna 412-1 (e.g., the second antenna 120, the third antenna 122, the fourth antenna 124, as illustrated in FIG. 1) through a bandpass filter 414-1. Likewise, the output port 410-1 may be coupled to the antenna 412-1 through a bandpass filter 416-1.

FIGS. 4-2 to 4-4 illustrate example implementations of the receive chain of the system configured for concurrent communication in multiple TDD bands. In the example implementations 400-2, 400-3, and 400-4, the receive chain 400 may further include a switch 418. For example, in FIG. 4-2, implementation 400-2 may include the switch 418-2. The switch 418-2 may have an input port 420-2 coupled to bandpass filter 414-2 and an input port 422-2 coupled to the bandpass filter 416-2. The switch 418-2 may have an output port 424-2 coupled to the antenna 412-2. In this manner, the antenna 412-2 is coupled to a receive port 406-2 of a receiver 407-2. For example, in FIG. 4-3, implementation 400-3 may include the switch 418-3. The switch 418-3 may have an input port 420-3 coupled to bandpass filter 414-3 and an input port 422-3 coupled to the bandpass filter 416-3. The switch 418-3 may have an output port 424-3 coupled to the antenna 412-3. In this manner, the antenna 412-3 is coupled to a receive port 406-3 of a receiver 407-3. For example, in FIG. 4-4, implementation 400-4 may include the switch 418-4. The switch 418-4 may have an input port 420-4 coupled to bandpass filter 414-4 and an input port 422-4 coupled to the bandpass filter 416-4. The switch 418-4 may have an output port 424-4 coupled to the antenna 412-4. In this manner, the antenna 412-4 is coupled to a receive port 406-4 of a receiver 407-4.

Figure 5:
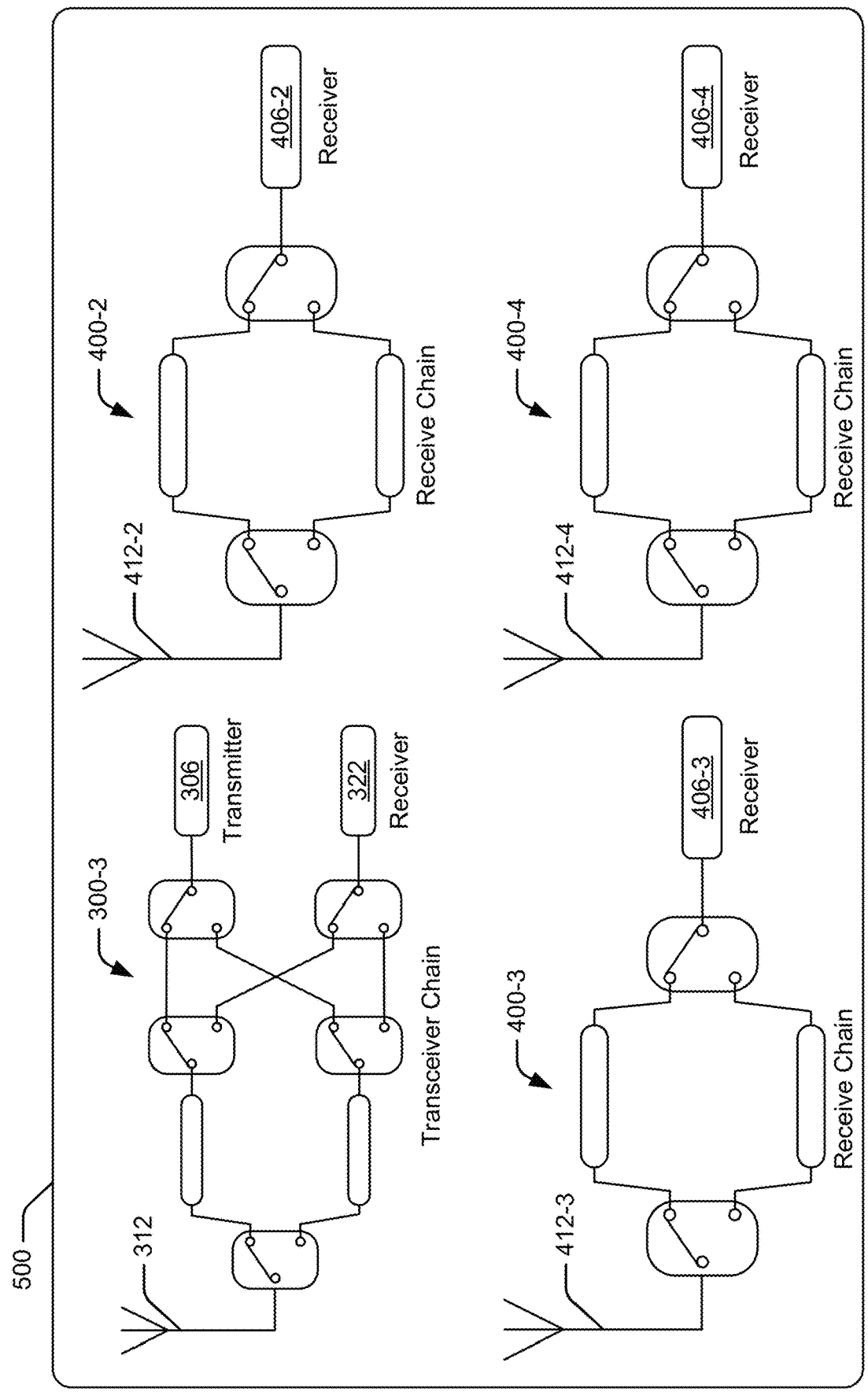
FIG. 5 illustrates an example concurrent communication module of a system configured for concurrent communication in multiple TDD bands.

FIG. 5 illustrates an example concurrent communication module 500 of a system configured for concurrent communication in multiple TDD bands. As illustrated, concurrent communication module 500 may include a combined transmit chain and receive chain, or transceiver chain as described by implementation 300-3. Additionally, the communication module 500 may include three receive chains as described by implementations 400-2, 400-3, and 400-4. The concurrent communication module 500 selectively connects: antenna 312 to transmit port 306 and receive port 322; antenna 412-2 to receive port 406-2; antenna 412-3 to receive port 406-3; and antenna 412-3 to receive port 406-3. Implemented in this manner, the concurrent communication module 500 may transmit and receive multiple TDD bands concurrently.

Figure 6:
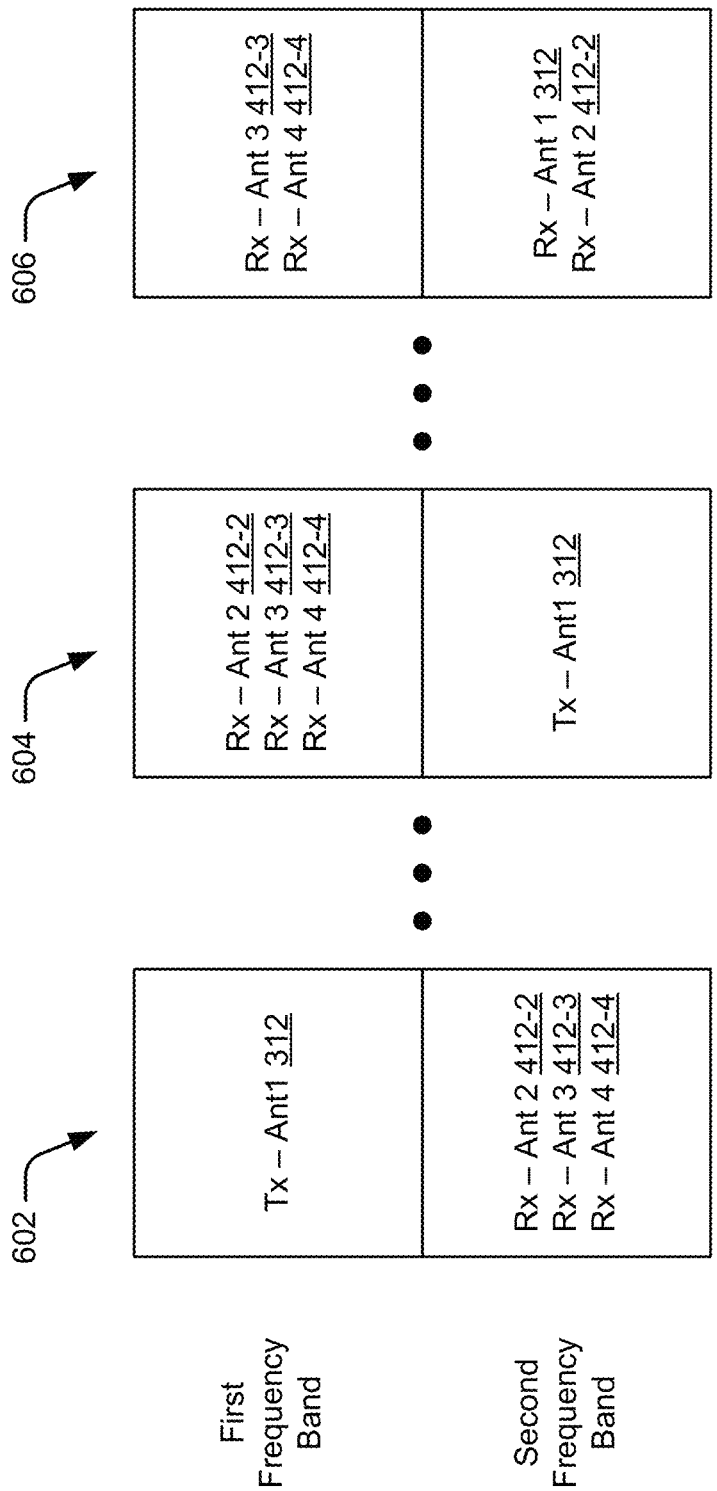
FIG. 6 illustrates example time slot configurations of a subframe of time resources of a wireless network used for concurrent communication in multiple TDD bands.

FIG. 6 illustrates example time slot configurations of a subframe of time resources of a wireless network used for concurrent communication in multiple TDD bands. Three example time slot configurations are illustrated. The time slot configurations may be arranged in a subframe along with other configurations not illustrated in FIG. 6. Each time slot configuration is illustrated with two sections: first frequency band actions and second frequency band actions. The actions taken in each time slot may be executed by a TDD band communication manager (e.g., the TDD band communication manager 206 from FIG. 2) controlling the concurrent communication module 500.

In time slot 602, the first frequency band may be transmitted by the transceiver chain 300-3. The receive chains 400-2, 400-3, and 400-4 each may receive on the second frequency band. During time slot 604, the frequency band actions are reversed relative to time slot 602. In time slot 604, the first frequency band may be received on receive chains 400-2, 400-3, and 400-4. The transceiver chain 300-3 may transmit the second frequency band. Time slot 606 is an all-receive time slot and splits the resources between the two frequency bands. In time slot 606, receive chains 400-3 and 400-4 may receive the first frequency band, and transceiver chain 300-3 and receive chain 400-2 receive on the second frequency band. However, in time slot 606, the chains may be configured such that receive chains 400-3 and 400-4 may receive the second frequency band, and transceiver chain 300-3 and receive chain 400-2 receive on the first frequency band. Likewise, three of the receive chains may be configured for one frequency band, and the fourth receive chain may be configured for the other frequency band.

FIG. 7 illustrates an example subframe 700 of time resources of a wireless network used for concurrent communication in multiple TDD bands. In the example, the subframe 700 includes fourteen slots; however, the subframe 700 may be divided into any number of slots depending on the application and the industry standards governing the system. The slot actions of the slots of subframe 700 may include one of the particular time slots described previously and illustrated in FIG. 6. The slot actions of subframe 700 may further include all four chains receiving on one frequency band and be a flexible slot with a guard period for the other frequency band. Generally, the guard period is assigned a slot immediately prior to a slot that may transmit. The guard period provides time for the transceiver to switch bands before transmitting.

In slot 702, the time slot 602 from FIG. 6 is implemented. That is, the transceiver chain 300-3 may transmit on the first frequency band, and the receive chains 400-2, 400-3, and 400-4 may receive on the second frequency band. Slot 704 is configured to permit all four communication chains 300-3, 400-2, 400-3, and 400-4, to receive on the first frequency band. The action for the second frequency band, during the slot 704, is the guard period action. In slot 706, the time slot 604 from FIG. 6 is implemented. During slot 706, the second frequency band may transmit on transceiver chain 300-3, and the receive chains 400-2, 400-3, and 400-4 may receive on the first frequency band. Slot 708 may be implemented as time slot 606 from FIG. 6. Each frequency band receives on two of the communication chains. In slot 710, the first frequency band may have a guard period, and the second frequency band may be received on all four communication chains.

The actions of slots 702, 704, 706, 708, and 710 repeat for slots 712, 714, 716, 718, and 720, respectfully. That is, the same action taken in slot 702 is taken in 712, the same action taken in slot 704 is taken in 714, and so forth. Likewise, the same action taken in 712 is taken in 722, the same action taken in 714 is taken in 724, the same action taken in 716 is taken in 726, and the same action taken in 718 is taken in 728.

In this manner, the systems and methods described herein may achieve an efficient and inexpensive way to concurrently communicate in multiple TDD bands. For a particular example, for band 41 concurrent with band 53, a traditional architecture would require 8 antennas (one antenna connected with an n41 transmit port and an n41 receive port, three antennas connected to respective n41 receive ports, one antenna connected with an n53 transmit port and an n53 receive port, three antennas connected to respective n53 receive ports). In an example implementation, n41 and n53 are handled by concurrent communication module 500 using four antennas: antenna 312 is selectively coupled to n41 and N53 transmitter 306 and n41 and n53 receiver 322 through switch 332, bandpass filter 314 for n41, switch 328, switch 302, bandpass filter 316 for band n53, switch 330, switch 320, 306 is transmitter for n41 and n53; antenna 412-2 is selectively connected to n41 and n53 receiver 406-2 through switch 418-2, n41 bandpass filter 414-2, n53 bandpass filter 416-2, and switch 402-2; antenna 412-3 is selectively connected to n41 and n53 receiver 406-3 through switch 418-3, n41 bandpass filter 414-3, n53 bandpass filter 416-3, and switch 402-3; and antenna 412-4 is selectively connected to n41 and n53 receiver 406-4 through switch 418-4, n41 bandpass filter 414-4, n53 bandpass filter 416-4, and switch 402-4. For n41 and n53 concurrent channels to share the same transmitter and receiver chains, this 4-antenna arrangement is able to accommodate uplink throughput of 6 slot layer and downlink throughput of 44 slot layer using the slot arrangement shown in FIG. 7.

Conclusion

Although aspects of systems and techniques directed at concurrent communication in multiple TDD bands have been described in language specific to features or systems, the subject of the appended claims is not necessarily limited to the specific features or methods described. Rather, the specific features and methods are disclosed as example implementations of systems and techniques directed at concurrent communication in multiple TDD bands, and other equivalent features and methods are intended to be within the scope of the appended claims. Further, various different aspects are described in this document, and it is to be appreciated that each described aspect can be implemented independently or in connection with one or more other described aspects.

What is claimed is:

1. A system comprising:
at least four antennas that support communication in a first frequency band and a second frequency band;
an RF modem module comprising:
a transceiver port to transmit uplink communications and receive downlink communications in the first frequency band and the second frequency band; and
at least three receive ports to receive respective communications in the first frequency band and the second frequency band;
transceiver circuitry coupling the at least four antennas to the RF modem module, the transceiver circuitry comprising:
a transceiver chain that comprises:
a first switch with a common terminal coupled to the transceiver port, a first switched terminal coupled to a first of the four antennas through a first bandpass filter for the first frequency band, and a second switched terminal coupled to the first antenna through a second bandpass filter for the second frequency band;
a second switch with a common terminal coupled to the transceiver port, a first switched terminal coupled to the first antenna through the first bandpass filter, and a second switched terminal coupled to the first antenna through the second bandpass filter;
a first receive chain that comprises a third switch with a common terminal coupled to a second receive port, a first switched terminal coupled to a second antenna through a third bandpass filter for the first frequency band, and a second switched terminal coupled to the second antenna through a fourth bandpass filter for the second frequency band;
a second receive chain that comprises a fourth switch with a common terminal coupled to a third receive port, a first switched terminal coupled to a third antenna through a fifth bandpass filter for the first frequency band, and a second switched terminal coupled to the third antenna through a sixth bandpass filter for the second frequency band; and
a third receive chain that comprises a fifth switch with a common terminal coupled to a fourth receive port, a first switched terminal coupled to a fourth antenna through a seventh bandpass filter for the first frequency band, and a second switched terminal coupled to the fourth antenna through an eighth bandpass filter for the second frequency band, the transceiver path further comprising:
a sixth switch coupled between the first switch, the second switch, and the first bandpass filter, the sixth switch comprising a first switched terminal coupled to the first switched terminal of the first switch, a second switched terminal coupled to the first switched terminal of the second switch, and a common terminal coupled to the first bandpass filter; and
a seventh switch coupled between the first switch, the second switch, and the second bandpass filter, the seventh switch comprising, a first switched terminal coupled to the second switched terminal of the first switch, a second switched terminal coupled to the second switched terminal of the second switch, and a common terminal coupled to the second bandpass filter.

2. The system of claim 1, further comprising:
an eighth switch coupled between the first bandpass filter, the second bandpass filter, and the first antenna, the eighth switch comprising a first switched terminal coupled to the first bandpass filter, a second switched terminal coupled to the second bandpass filter, and a common terminal coupled to the first antenna;
a ninth switch coupled between the third bandpass filter, the fourth bandpass filter, and the second antenna, the ninth switch comprising a first switched terminal coupled to the third bandpass filter, a second switched terminal coupled to the fourth bandpass filter, and a common terminal coupled to the second antenna;
a tenth switch coupled between the fifth bandpass filter, the sixth bandpass filter, and the third antenna, the tenth switch comprising a first switched terminal coupled to the fifth bandpass filter, a second switched terminal coupled to the sixth bandpass filter, and a common terminal coupled to the third antenna; and
an eleventh switch coupled between the seventh bandpass filter, the eighth bandpass filter, and the fourth antenna, the eleventh switch comprising a first switched terminal coupled to the seventh bandpass filter, a second switched terminal coupled to the eighth bandpass filter, and a common terminal coupled to the fourth antenna.

3. The system of claim 1, wherein:
the first frequency band comprises a first Fifth Generation (5G) New Radio band; and
the second frequency band comprises a second 5G New Radio band.

4. The system of claim 1, wherein the system communicates with a wireless network through the first frequency band and the second frequency band during time slots of a subframe of time resources of the wireless network;
the system further comprises a communication manager configured to:
during a first slot of the subframe:

couple the transceiver port to the first antenna through the first switch and the first bandpass filter;

couple the second receive port to the second antenna through the third switch and the fourth bandpass filter;

couple the third receive port to the third antenna through the fourth switch and the sixth bandpass filter; and couple the fourth receive port to the fourth antenna through the fifth switch and the eighth bandpass filter; and during a second slot of the subframe:

couple the transceiver port to the first antenna through the first switch and the second bandpass filter;

couple the second receive port to the second antenna through the third switch and the third bandpass filter;

couple the third receive port to the third antenna through the fourth switch and the fifth bandpass filter; and couple the fourth receive port to the fourth antenna through the fifth switch and the seventh bandpass filter.

5. The system of claim 4, wherein the communication manager is further configured to:

during the first slot of the subframe:

transmit, through the first antenna, on the first frequency band;

receive, through the second antenna, on the second frequency band;

receive, through the third antenna, on the second frequency band; and receive, through the fourth antenna, on the second frequency band; and during the second slot of the subframe:

transmit, through the first antenna, on the second frequency band;

receive, through the second antenna, on the first frequency band;

receive, through the third antenna, on the first frequency band; and receive, through the fourth antenna, on the first frequency band.

6. The system of claim 4, wherein the communications manager is further configured to, during a third slot of the subframe:

couple the first receive port to the first antenna through the second switch and the second bandpass filter;

couple the second receive port to the second antenna through the third switch and the fourth bandpass filter;

couple the third receive port to the third antenna through the fourth switch and the fifth bandpass filter; and couple the fourth receive port to the fourth antenna through the fifth switch and the seventh bandpass filter.

7. The system of claim 6, wherein the communications manager is further configured to, during the third slot of the subframe:

receive, through the first antenna, on the second frequency band;

receive, through the second antenna, on the second frequency band;

receive, through the third antenna, on the first frequency band; and receive, through the fourth antenna, on the first frequency band.

8. The system of claim 4, wherein the first slot and the second slot are not consecutive slots of the subframe.

* * * * *